United States Patent [19]

Marin

[11] Patent Number: 5,597,270
[45] Date of Patent: Jan. 28, 1997

[54] CUTTING INSERT FOR BORERS

[75] Inventor: Enzo Marin, Sedriano, Italy

[73] Assignee: OMUS S.p.A. in Amministrazione Straordinaria, Bollate, Italy

[21] Appl. No.: 314,059

[22] Filed: Sep. 28, 1994

[30] Foreign Application Priority Data

Oct. 1, 1993 [IT] Italy ................... MI930761 U

[51] Int. Cl.⁶ ................... B23B 27/00
[52] U.S. Cl. ................... 407/102; 407/47
[58] Field of Search ................... 407/101, 102, 407/103, 104, 105, 106, 113, 116, 119, 33, 47, 48, 49; 408/713, 233

[56] References Cited

U.S. PATENT DOCUMENTS

| | | | |
|---|---|---|---|
| 3,213,716 | 10/1965 | Getts | 408/713 X |
| 3,882,581 | 5/1975 | Merenes | 407/113 X |
| 4,011,049 | 3/1977 | McCreery | 407/113 X |
| 4,883,391 | 11/1989 | Tsujimura et al. | 407/48 X |
| 5,160,228 | 11/1992 | Arai et al. | 407/48 X |

FOREIGN PATENT DOCUMENTS 2552874  2/1977  Germany ................... 407/113

Primary Examiner—Daniel W. Howell
Assistant Examiner—Henry W. H. Tsai
Attorney, Agent, or Firm—Bucknam and Archer

[57] ABSTRACT

A cutting insert (10) or (10') for boring machines is constituted by a substantially prismatic body, with two cutting sides, whose front surface is centrally provided with a slightly concave portion (12) or (12'), which extends for the whole longitudinal development. The insert (10) or (10') is locked in a traditional hollow space (16) obtained on the head (18) of a boring machine, by means of one or more screws (20) whose lower sector, substantially truncated-conic, shows a slight convexity, perfectly complementary to the concave configuration of the central portion (12) or (12') of said insert.

5 Claims, 1 Drawing Sheet

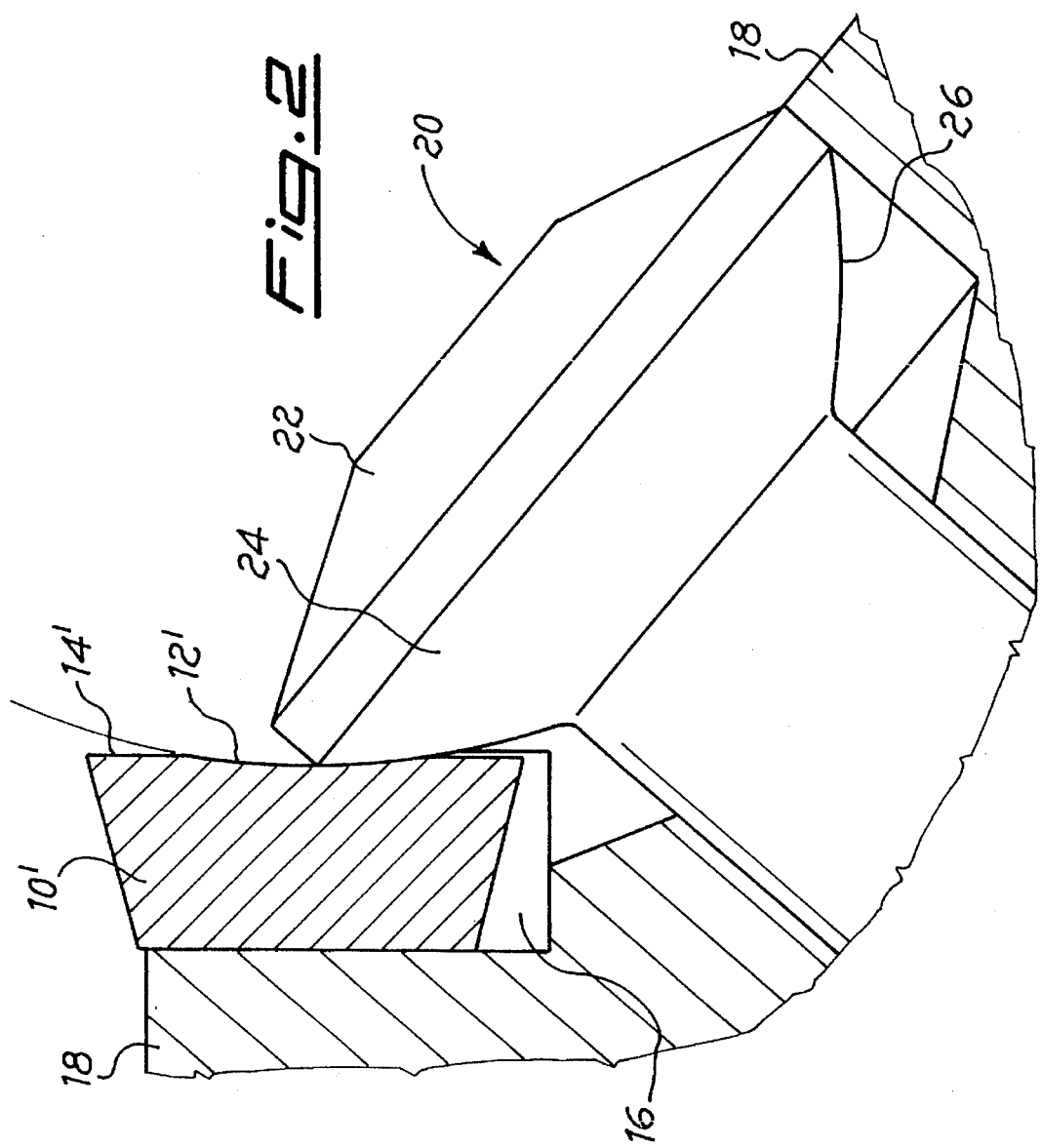
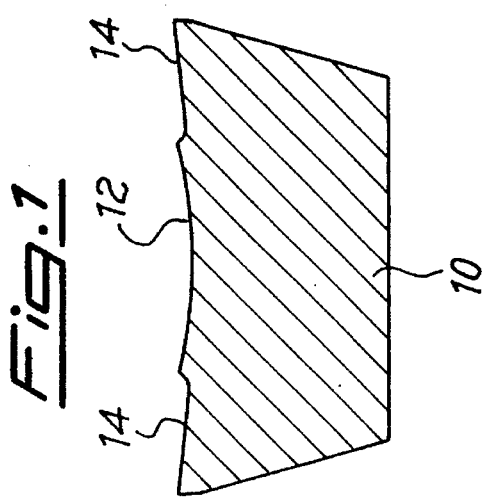

CUTTING INSERT FOR BORERS

FIELD OF THE INVENTION

The invention relates to an improved insert, constituted by an interchangeable blade with two cutting sides, a front of which is provided with a slightly concave seat, longitudinally extended, along which the head of a locking screw is positioned, which locks said insert within the supporting stem.

DESCRIPTION OF THE PRIOR ART

It is known that to carry out some mechanical precision workings on through or dead holes and cylindrical or conical hollow spaces, special tools are utilized having single or multiple cutting edges, by means of which one rebores the holes already obtained in the part; the little quantity of material or machining allowance which is removed allows to standardize and bring to the wished diameter, with very strict tolerances, the internal surface of the hole or hollow space. Said tools, called borers, are traditionally constituted by a stem carrying at one end a stem wherein the cutting body is housed and restrained in a special groove or hollow space; the opposite end of the stem is generally conified to engage in the spindle of the borer or of other machine tools, such as, for instance, millers and lathes. Concerning the locking of the insert on the head of the borer, several systems are known depending on which said insert are realized according to different configurations.

The basic requirement is that of ensuring that, during the operating stage, said cutting inserts, previously adjusted relatively to the exposure and adjustment of the cutting edge, do not come out of their seat.

In the U.S. Pat. No. 1,163,403, filed on 26 May, 1983, the same applicant had proposed an advantageous solution for the aforementioned problems; according to the invention of said patent, in the tool for the precision mechanical working in question, the fastening of the insert or blade is obtained through one or two screws, whose head has a truncated-conical portion suitable to get directly in touch with said insert, to tighten it in the corresponding hollow space obtained on the head of the borer.

The same patent provides, as means for the precision adjustment of the insert, other screws which, through pins with inclined plane heads, work on the back of the insert; the latter, according to the aforementioned locking and adjustment system, has a substantially trapezoid section, whose front surface, matched by the locking screws, is wholly flat.

This structural arrangement has proved advantageous, as it allows in the first place to realize an effective locking of the blade with no need for complicated technologies to obtain it; besides, such a borer is economically realizable, as it does not require the adoption of complex elements for locking the insert, constituted, for instance, by suitably shaped jaws such as are found, for instance, in other tools.

However, it has been noticed that, in particular conditions of utilization of the borer, or during the tightening of the screws, the insert is subject to forces which tend to the exact positioning in the seat. This is a drawback which, because of the extremely reduced working tolerances allowed, may become very important and involve, in some cases, the rejection of the pieces so treated.

SUMMARY OF THE INVENTION

An object of this invention, which is conceptually connected to the aforementioned patent as concerns the general structure of the boring body, is to obviate the above drawback.

More particularly, an object of this invention is to provide an improved insert for borers, suitable to be stably tied to the head of the stem which constitutes its support, in any operating conditions and with any locking however obtained.

A further object of this invention is to provide an insert as above defined, capable of providing a high level of resistance and reliability in the long run, and also such as to be easily and economically realizable.

These and still other objects are obtained with the improved insert for borers, subject matter of this invention, constituted by a substantially prismatic body, housed in a hollow space of the head of a borer and restrained in it by one or more screws which match directly, with their head, the front surface, and which is basically characterized by the fact that the latter has, along a longitudinally extended central portion, a slightly hollow space, complementary to the convex configuration of the lower part of said head of the screw(s).

The mechanical and functional characteristics of the improved insert subject matter of this invention shall be more clearly shown by the following description of a preferred non limitative embodiment, made with reference to the attached drawings, wherein:

FIG. 1 shows the through section of the blade or insert subject matter of this invention;

FIG. 2 shows a section of the boring body, with the insert positioned in the corresponding hollow space, in the plane containing a locking screw.

With reference to FIG. 1, the improved cutting insert for borers, subject matter of this invention, is constituted by a substantialy prismatic body 10, made of hard metal, with two cutting sides and a longitudinal extension variable depending on the depth of the hole or hollow space to be worked. The front surface of the insert 10 develops longitudinally on slightly differentiated levels; the central portion, indicated by 12, has a slight concavity and joins the opposing side portions 14 which develop along a slightly lower plane; these side portions 14 have a markedly shorter width with respect to that of the concave central portion 12, approximately equal to about half the width of the latter, according to a preferred, non critical embodiment. The planes forming the same side portions are slightly inclined towards the longitudinal axis of the insert 10 and join, with a slight radius, the central portion 12. The concavity of the latter is noticeable on each of the points of its longitudinal development, which forms an arc of circle whose radius is advantageously comprised between 3 and 10 mm and constitutes the innovatory concept of this invention, being exactly complementary to the lower part of the head of the screw which tightens the insert, as is schematically shown by FIG. 2.

In FIG. 2, the insert is indicated by 10', and is arranged in the corresponding groove 16, obtained on head 18 of a boring body, not shown integrally as its structure is basically identical to the one which is the subject matter of the aforementioned patent. The insert, according to how it is represented in FIG. 2, which proposes a marginally alternative embodiment, has a slightly concave central portion 12', from whose opposite fronts side portions 14' develop which are rectilinear instead of slightly inclined 14 towards the longitudinal axis, as indicated, on the contrary, by the representation of FIG. 1.

The screw that performs the tightening on insert 10 and 10', indicated on the whole by 20, has a head 22 provided with sharp corner perimetral facets and an underlying sector 24 substantially truncated-conical, wherein the perimetral band 26 shows a slight convexity and is suitable to directly match the concave portion 12 or 12' of the cutting edge 10 or 10'.

As mentioned before, the convexity of sector 26, obtained along the lower part of head 22 of the mentioned screw, is perfectly complementary to the concave configuration of the central sector 12 or 12' of the cutting edge 10 or 10'; this particular conformation avoids the danger of unwanted, even though minimum, shiftings of the insert 10 or 10' from its position in seat 16 of head 18, or during the working stage, as will be specified hereafter. A part at least of the lower convex sector 26 of screw 20, possibly of two or more locking screws, connect with exactness with a corresponding extension of the concave portion 12 or 12' obtained along the front surface of the insert 10 or 10' in central position, longitudinally extended on it with a constant development; during the stage of locking of insert 10 or 10', preceded by its exact exposure and/or angle, the aforementioned screw or screws approach and tighten it on head 18 of the borer, without encountering lever points which might modify the pre-established and optimum positioning. Even during the working stage, in the presence of possible vibrations or thrust stresses, the insert does not change significantly its exposure or angle relatively to the wall of the body to be worked, the possible minimum allowed shiftings being only possible in the longitudinal direction.

As can be noticed from the above, the advantages of this invention are evident.

The improved insert for borers, subject matter of this invention, is stably positioned in the hollow space obtained along the head of the borer in any operating condition; besides, such positioning does not suffer from the starting or subsequent tightening of the screws which operate directly on its front surface.

However, this embodiment, as described hereabove and claimed hereafter, has been merely proposed by way of example, being understood that the same is susceptible of many modifications and changes, all of which fall within the scope of the innovatory concept.

For instance, the insert may have, along its central portion, a more or less marked concavity relatively to what has been described and illustrated by way of example, causing as a consequence the corresponding change in the convex conformation of the lower part of the head of the screw or screws which tighten on it.

The same concave portion may have a longer transversal extension, affecting possibly the whole front surface of the insert. With respect to the locking, an analogous structure is obtained on one-blade inserts.

Lastly, also structural inversions or alternative dislocations are possible of the elements that form together the cutting insert subject matter of this invention.

I claim:

1. The combination of a cutting insert for borer, the borer and a screw, wherein the cutting insert is made of hard metal, has two cutting sides, a front surface and is constituted by a substantially prismatic body (10) or (10'), said borer has a head (18), said head has a hollow space (16) and said cutting insert is housed in said hollow space and is restrained in it by at least one screw (20), said screw having a head (22) and a lower part (26), said lower part having a convex configuration, said insert having along a longitudinally extended central portion (12) (12'), a slight concavity, said concavity of said insert being completely complementary to said convex configuration of said lower part (26) of said screw (20).

2. The combination according to claim 1 wherein said concavity of said central portions (12) (12') has an arc of a circle, said circle having radius comprised between 3 and 10 mm.

3. The combination according to claim 1 wherein said cutting insert has a longitudinal axis, two side portions (14) (14'), said side portions having a width, said width of said side portions (14) (14') is approximately equal to one-half the concavity of said central portion (12) (12'), and said side portions develop along planes slightly inclined towards said longitudinal axis of said insert.

4. The combination according to claim 1 wherein said cutting insert has a longitudinal axis, two side portions (14) (14'), said side portions have a width, said width of said side portions (14) (14') is approximately equal to one-half the concavity of said central portion (12), said side portions (14'), adjoining the concave central portion (12'), develop along horizontal planes.

5. The combination according to claim 1 wherein said hollow space (16) in said head (18) of said borer is complementary to the lower part (26) of the head of said screw.

\* \* \* \* \*